3,406,332

GALVANOMAGNETIC RESISTANCE DEVICE WITH FEEDBACK COUPLED EXCITATION WINDING

Hans Hieronymus, Erlangen, Germany, assignor to Siemens Aktiengesellschaft, a corporation of Germany Filed June 17, 1966, Ser. No. 558,512
Claims priority, application Germany, July 1, 1965, S 97,915
13 Claims. (Cl. 323—75)

The present invention relates to a galvanomagnetic resistance device. More particularly, the invention relates to a galvanomagnetic resistance device with feedback coupled excitation winding.

The electrical resistance of certain semiconductor substances such as, for example, indium antimony or indium arsenide, may be controlled, varied or adjusted by a magnetic field. This is known as the Gauss effect, and is described in Z. Phys., 138, 1954, pages 322 to 329. When the magnetic field is relatively small, that is, when the result of the mobility of the charge carriers in the semiconductor and the magnetic field is small, the resistance of the semiconductor changes almost proportionally to the square of the effective magnetic field. This dependence upon the magnetic field is particularly pronounced when a plurality of inclusions of electrically well conducting material are added to the semiconductor body. The added inclusions are of anisotropic structure and are arranged substantially parallel to each other. Semiconductor material having such inclusions is described in Z. Phys., 176, 1963, pages 399 to 408.

A magnetically controllable semiconductor resistance is known in the art as a field plate. If the resistance of a field plate in a zero magnetic field is $R_0$ and the resistance of the field plate in a magnetic field B is $R_B$, the resultant resistance in a small magnetic field is approximately $$R_B = R_0(1+kB^2)$$

which is a square relationship wherein $k$ is a material constant. Actually, the resistance $R_B$ does not follow the foregoing function exactly, even in small magnetic fields of less than 5 kilogauss. Thus, for example, for $R_B=2R_0$ an error of up to 2% occurs with conventional field plates. For larger magnetic fields of greater than 10 kilogauss, for example, there is an almost linear relationship between $R_B$ and B.

It may be advantageous in some instances to operate within the linear range such as, for example, by premagnetizing a field plate, as described in German Patent No. 1,025,504. There are many instances, however, in which it is desirable that the resistance of the field plate varies as closely as possible with the square of another magnitude. Such magnitude may, for example, be the excitation current of an electromagnet in the air gap of which the field plate is positioned. It is desirable that the resistance of the field plate vary as closely as possible with the square of another magnitude in an analog computer or multiplier comprising a push-pull circuit having two field plates in two branches of a measuring bridge, as described in Solid State Electronics 7, 1964, pages 363 to 371. Each of the field plates is positioned in the air gap of an electromagnet having an excitation winding and a premagnetizing winding. The excitation and premagnetizing windings are connected in series to different current sources. The windings of the magnet are coupled in opposition to each other. The purpose of the circuit is to measure a signal voltage in the diagonal of the bridge, such signal voltage being directly proportional to the product of the bridge current, the current in the excitation winding and the current in the premagnetizing winding. This may be attained only if the field plate resistances vary directly in proportion with the square of the energizing magnetic fields.

Heretofore, attempts to utilize the approximate square relation between the field plate resistance and the energizing magnetic field in practical applications have been unsuccessful. This is due to the fact that prior to the present invention, a sufficiently exact square relation was not attainable.

The principal object of the present invention is to provide a new and improved galvanomagnetic resistance device. The galvanomagnetic resistance device of the present invention provides a square relation which is variable as desired and which is considerably more exact than the square relations heretofore attainable, such square relation being between the first field plate resistance and the total current.

In accordance with the present invention, a galvanomagnetic resistance device comprises an electromagnet having an excitation winding and an air gap. A first field plate is positioned in the air gap of the electromagnet. The first field plate has an electrical resistance and a current flowing therethrough. A second field plate is positioned in the air gap of the electromagnet. The second field plate is connected in parallel with the excitation winding of the electromagnet so that the resistance of the first field plate varies in proportion with the square of a current applied jointly to the excitation winding and the second field plate. A resistor, which is preferably a variable resistor, is connected in series with the second field plate to provide a series connection, and the series connection of the second field plate and the resistor is connected in parallel or in shunt with the excitation winding of the electromagnet. A variable inductance may be connected in series with the second field plate and the resistor in the shunt connection across the excitation winding of the electromagnet. A thermistor may be connected in series with the excitation winding, so that the series connection of the second field plate and the resistor and the variable inducance is then connected in parallel with the series connection of the excitation winding and the thermistor. The thermistor is preferably a variable thermistor.

The galvanomagnetic resistance device of the present invention may be utilized in a multiplier circuit which comprises a pair of such galvanomagnetic resistance devices connected in series with each other. In the multiplier circuit each of the galvanomagnetic resistance devices comprises the aforementioned galvanomagnetic resistance device of the present invention. In the multiplier circuit, each of the galvanomagnetic resistance devices further comprises a premagnetization winding. The premagnetization windings of the galvanomagnetic resistance devices are connected in series with each other. The excitation windings of the galvanomagnetic resistance devices are connected in opposition to each other. A bridge circuit utilizes the first field plate of one of the galvanomagnetic resistance devices as one of its branches and utilizes the first field plate of the other of the galvanomagnetic resistance devices as the other of its branches. A third field plate is connected in parallel with the premagnetization winding of each of the galvanomagnetic resistance devices. A variable resistor is connected in series with the third field plate of each of the galvanomagnetic resistance devices to provide a series connection and the series connection is connected in parallel with the corresponding premagnetization winding.

In order that the present invention may be readily carried into effect, it will now be described with reference to the accompanying drawings, wherein.

Figure 1:
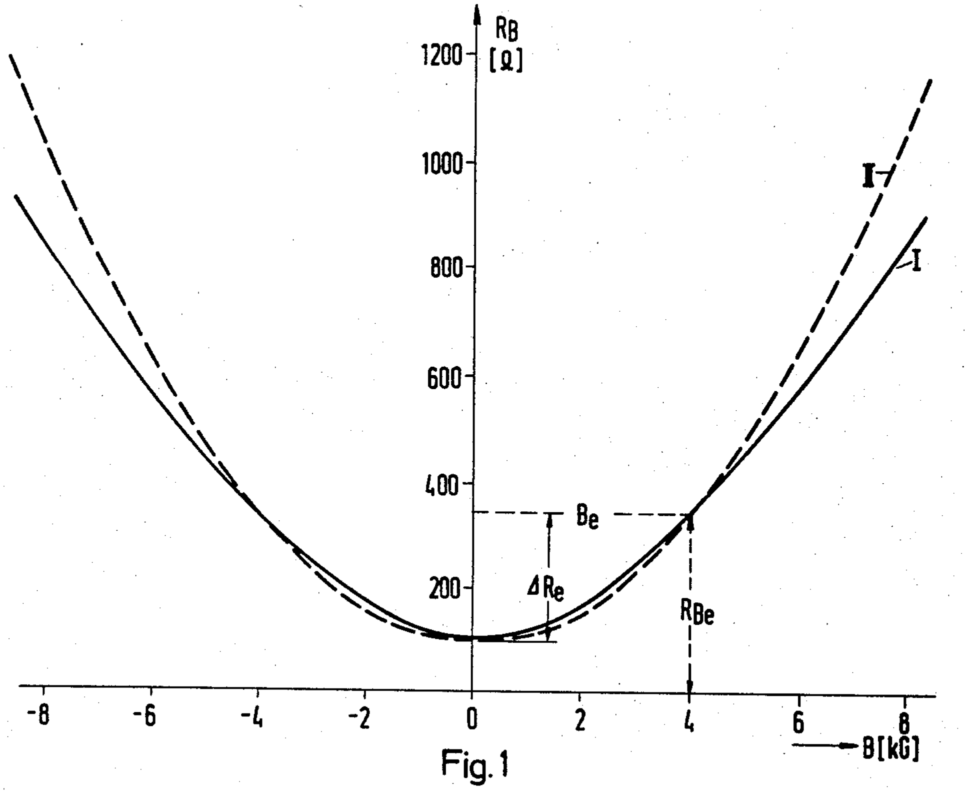
FIG. 1 is a graphical presentation of a field plate resistance characteristic.

In FIG. 1, curve I indicates the resistance $R_B$ of a field plate of known type in accordance with the magnetic field intensity. In FIG. 1, the abscissa indicates the magnetic field intensity B in kilogauss and the ordinate indicates the field plate resistance in ohms. The resistance varies as indicated in the lower region of the curve and is approximately in square relation with the magnetic field intensity, so that the field plate resistance varies approximately in accordance with the equation $$R_B = R_0(1+kB^2)$$

The variation of the field plate resistance does not even approximate a square relation with the magnetic field intensity at higher magnitudes of such magnetic field intensity. The more effective the control, the greater the deviation of the field plate resistance from the specified function.

In FIG. 1, curve II is presented for comparison purposes with curve I and represents an ideal or exactly square relationship between the field plate resistance $R_B$ and the magnetic field intensity B. The curve II and the curve I contact each other at a magnetic field intensity B of zero and intersect each other at points $+B_e$ and $-B_e$. At the points $+B_e$ and $-B_e$, the magnetic field intensity is +4 kilogauss and −4 kilogauss, respectively. The curves I and II deviate from each other to a certain extent in their lower regions and deviate from each other to a considerably greater extent in their upper regions.

A deviation of error F is the difference between the actual field plate resistance $R_B$ in a magnetic field intensity B and an exact or ideal square relation as illustrated by the curve II. The error F is defined relative to the desired magnitude of the field plate resistance variation $R_e = R_{Be} - R_0$, wherein the maximum applied magnetic field intensity is $B_e$ and $R_{Be}$ is the field plate resistance at such magnetic field intensity. The error F is then defined as $$F = \frac{R_B' - R_B}{R_{Be} - R_0}$$

The smaller the selected region, the more the error F decreases. That is, the smaller the value of $B_e$, the smaller the error.

If the field plate is positioned in the air gap of an electromagnet, then, instead of the magnetic field intensity B, the excitation current $I_M$ flows through the excitation winding. The error F may increase somewhat due to saturation variations in the iron core of the magnetic circuit.

Figure 2:
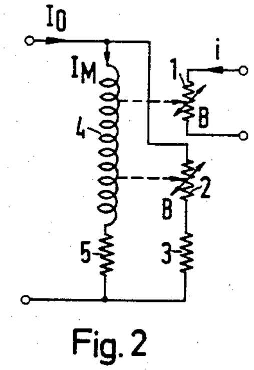
FIG. 2 is a circuit diagram of an embodiment of the galvanomagnetic resistance device of the present invention.

In FIG. 2, a first field plate 1 has an electrical resistance which it is desired to vary as closely proportional or as closely as possible to the square of the total or control current $I_0$. The first field plate 1 and a second field plate 2 are positioned in the air gap of an electromagnet which is excited or energized by an excitation winding 4. An extraneous current *i* flows through the field plate 1. The electrical resistance of the excitation winding 4 is indicated by a resistor 5. The second field plate 2 is connected in series with a resistor 3 and the series connection of said second field plate and said resistor is connected in shunt or in parallel with the excitation winding 4. Thus, part of the total current $I_0$ flows through the excitation winding 4 as the excitation current $I_M$ and the remainder of said total current flows through the series connection of the second field plate 2 and the resistor 3.

When the total current $I_0$ is increased, the resistance of the second field plate 2 increases. The increase in resistance of the second field plate 2 decreases the current flow therethrough, so that the excitation current $I_M$ increases and such increased excitation current flows through the excitation winding 4. The increased flow of excitation current through the excitation winding 4 increases the slope of the resistance characteristic of the first field plate 1, so that the square relationship of the resistance of said field plate to the total current is made more exact. The error F may thus be kept at a very small value within a specified control range by suitable selection of the basic resistance of the second field plate 2 and of the series resistor 3 at the specified resistance 5 of the excitation winding 4.

Figure 3:
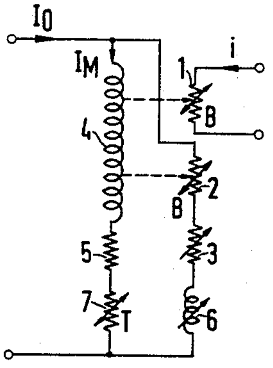
FIG. 3 is a modification of the embodiment of FIG 2.

In the modification of FIG. 3, the series resistor 3 is a variable resistor so that its resistance may be varied to provide an exactly square relation for each resistance characteristic of a field plate. In the modification of FIG. 3, a variable inductance 6 is connected in series with the second field plate 2 and the variable series resistor 3 and the series connection is connected in shunt or in parallel with a series connection of the excitation winding 4, the resistance of which is indicated by the resistor 5, and a thermistor 7. The variable inductance 6 compensates for the time constant of the excitation winding 4. The thermistor 7 is connected in series with the excitation winding 4 in order to compensate for the effect of temperature variations on the circuit and especially on said first field plate. An adjustable thermistor is preferably utilized in order to permit the use of any suitable thermistor in the general temperature range to permit the circuit to operate in various desired temperature ranges. A suitable thermistor for such use may comprise, for example, a galvanomagnetic material having an electrical resistance which is varied by means of a magnetic field at a specified temperature. The representative resistor 5 of the resistance of the excitation winding 4, shown in FIGS. 2 and 3, is omitted from FIG. 4.

Figure 4:
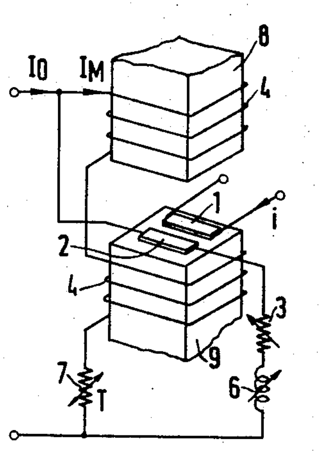
FIG. 4 is a perspective view and circuit diagram of the embodiment of FIG. 2 modified as in the modification of FIG. 3.

FIG. 4, which is a combination perspective view and circuit diagram of the modification of FIG. 3, illustrates the pole shoes 8 and 9 of the electromagnet in the air gap of which the first and second field plates 1 and 2 are positioned. The current flow and distribution is, of course, the same as in FIGS. 2 and 3.

Figure 5:
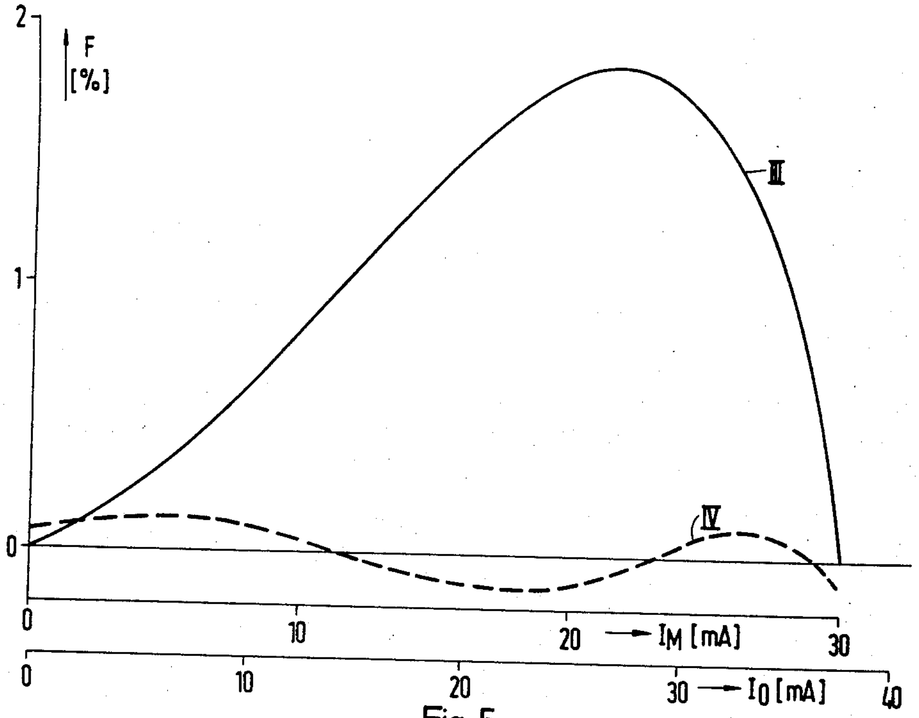
FIG. 5 is a graphical presentation of error curves of a prior art device and of a galvanomagnetic resistance device of the present invention.

FIG. 5 shows the error curve in accordance with the current $I_M$ through the excitation winding 4, of the current through the first field plate 1 (FIGS. 2, 3, 4) when the basic resistance $R_0$ of such field plate is 80 ohms, when said field plate is varied up to a resistance magnitude $R_{Be}$ of 145 ohms. In FIG. 5, the abscissa indicates the excitation of energization current $I_M$ in milliamperes and the total current $I_0$ in milliamperes and the ordinate indicates the error or deviation F of the square relation in percent. In FIG. 5, curve III shows the error which occurs in a prior art galvanomagnetic resistance device. As indicated, the maximum error in the curve is 1.8%.

Curve IV of FIGS. 5 shows the error which occurs in the galvanomagnetic resistance device of the present invention. In providing both curves III and IV of FIG. 5, the basic resistance of the galvanomagnetic resistance device is 80 ohms. The curve IV for the error occurring in the galvanomagnetic resistance device of the present invention is provided by controlling or varying the resistance of the first field plate 1 up to 145 ohms. The maximum error occurring in the galvanomagnetic resistance device of the present invention, under the stated conditions, as shown by the curve IV is only about $\pm 0.1\%$, which is considerably less than the maximum error which may occur in the prior art device, as shown in the curve III. The use of the series connection of the second field plate, the variable resistor and the variable inductance as a shunt across the excitation winding, in accordance with the present invention, thus reduces the error F drastically thereby bringing the square relation of the first field plate resistance to the total current considerably closer to exactness at a requirement of only about a 25% increase in the total current $I_0$ upon equal variation of the first field plate.

Figure 6:
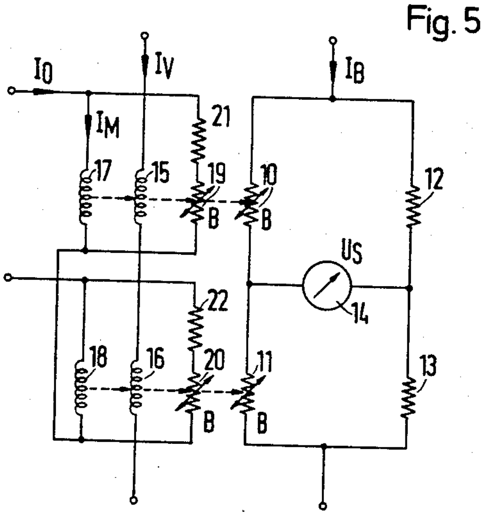
FIG. 6 is a circuit diagram of another embodiment of the galvanomagnetic resistance device of the present invention.

FIG. 6 shows a push-pull circuit which combines two galvanomagnetic resistance devices or circuits of the present invention. In FIG. 6, the two circuits of the present invention are connected in series with each other and together operate as an analog computer or multiplier for two or three inputs when first and second field plates 10 and 11 are connected in series with resistors 12 and 13 so that said field plates and resistors are all connected in a closed loop. The closed loop functions as a bridge circuit with a measuring or indicating device or meter 14 connected diagonally in such circuit between a point common to the two field plates and a point common to the two resistors. A bridge current $I_B$ is supplied to the bridge at the other diagonal between a point common to the first field plate 10 and the resistor 12 and a point common to the second field plate 11 and the resistor 13. The bridge thus comprises the first field plate 10 connected in one branch, the resistor 12 connected in another or second branch, the resistor 13 connected in still another or third branch and the second field plate 11 connected in still another or fourth branch.

Each of the first and second field plates 10 and 11 is positioned in the air gap of a corresponding electromagnet (not shown in the figure). Each of the first and second electromagnets comprises two windings, a premagnetization winding and an excitation winding. The first of the electromagnets has an excitation or energization winding 17 and a premagnetization winding 15, and the second of the electromagnets has an excitation or energization winding 18 and a premagnetization winding 16.

In FIG. 6, a premagnetizing current $I_V$ flows in the same direction through the premagnetization windings 15 and 16 of the electromagnets. The excitation current $I_M$ flows through the excitation windings 17 and 18 in opposite directions. Third and fourth field plates 19 and 20 are provided. The first and third field plates 10 and 19 cooperate with each other, the first field plate being the first field plate of the combination and the third field plate being the second field plate of the combination. The second and fourth field plates 11 and 20 cooperate with each other, the second field plate being the first field plate of the combination and the fourth field plate being the second field plate of the combination.

The third field plate 19 is connected in series with a first resistor 21 and the series connection of said third field plate and said first resistor is connected in shunt or in parallel with the first excitation winding 17. The first and third field plates 10 and 19 are positioned in the air gap of the first electromagnet. The fourth field plate 20 is connected in series with a second resistor 22 and the series connection of said fourth field plate and said second resistor is connected in shunt or in parallel with the second excitation winding 18. The second and fourth field plates 11 and 20 are positioned in the air gap of the second electromagnet.

If the premagnetizing current $I_V$ is maintained constant in magnitude, the resistances of the first and second field plates 10 and 11 vary exactly as the square of the total current $I_0$. The signal voltage $U_S$ at the measuring or indicating device 14 is then exactly proportional to the product of the bridge current $I_B$ and the current $I_0$, when the premagnetizing current $I_V$ is constant. The circuit of FIG. 6 thus functions as a multiplier of the two currents $I_B$ and $I_0$ and provides a resultant voltage $U_S$, which is measured by the meter 14. The premagnetization current $I_V$ is maintained constant. If the premagnetization current $I_V$ varies, however, and is multiplied with $I_B$ and $I_0$ to determine the product, the premagnetization windings 15 and 16 should be connected in the same manner that the excitation windings 17 and 18 are connected, in order to provide an exactly square relation between the premagnetizing current and the field plate resistances, in accordance with the present invention.

Figure 7:
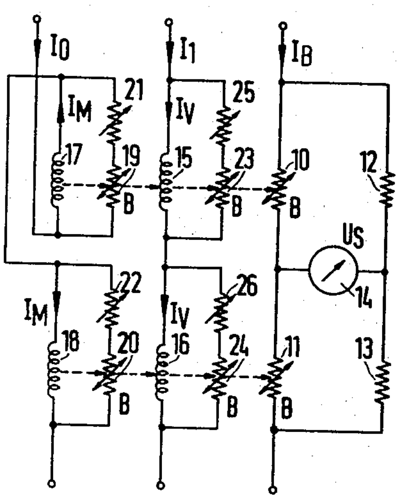
FIG. 7 is a modification of the embodiment of FIG. 6.

In the modification of FIG. 7, fifth and sixth field plates 23 and 24 are utilized and are connected in series with third and fourth resistors 25 and 26, respectively, which series connections are respectively connected in shunt or in parallel with the first and second premagnetizing windings 15 and 16, respectively. In FIG. 7, the bridge circuit is the same as that of FIG. 6 and includes the first and second field plates 10 and 11, and the first and second excitation or energization windings 17 and 18 are connected in the same manner as in FIG. 6 and are shunted by the third and fourth field plates 19 and 20, respectively.

In FIG. 7, the premagnetizing current $I_V$ is derived from a current $I_1$. The fifth field plate 23 is connected in series with the third resistor 25 and the series connection is connected in shunt or parallel with the first premagnetizing winding 15. The sixth field plate 24 is connected in series with the fourth resistor 26 and the series connection is connected in shunt or in parallel with the second premagnetization winding 16. In FIG. 7, as in FIGS. 2, 3 and 6, the broken lines having arrowheads represent electromagnets, or, more particularly, the magnetic fields produced by electromagnets. Thus, the first electromagnet in FIG. 7 includes the premagnetization winding 15 and the excitation winding 17 and the first, third and fifth field plates 10, 19 and 23 are positioned in the air gap of said first electromagnet. The second electromagnet includes the premagnetization winding 16 and the excitation winding 18 and the second, fourth and sixth field plates 11, 20 and 24 are positioned in the air gap of said second electromagnet. The electromagnets themselves are not shown in FIG. 7.

Figures 8, 9:
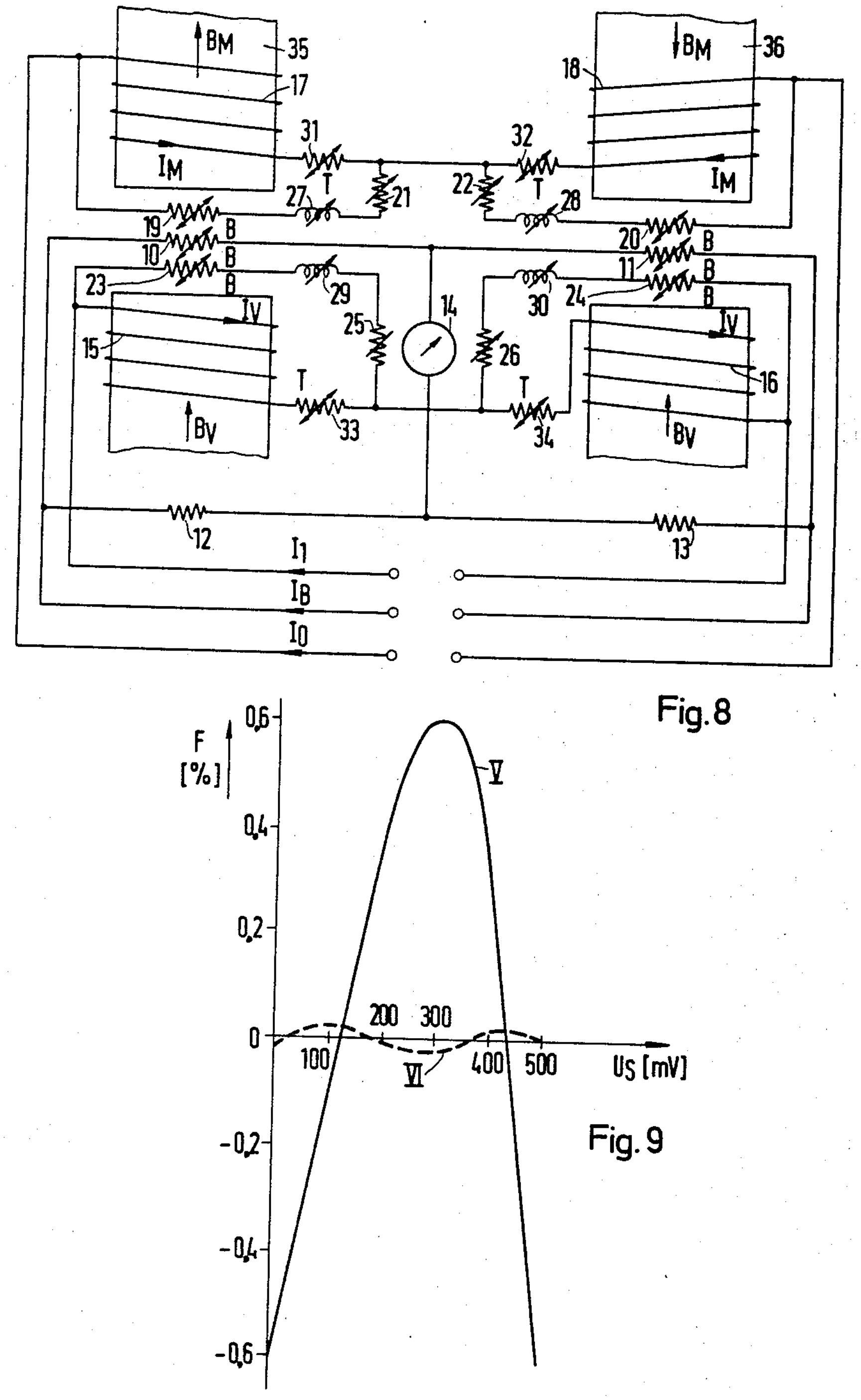
FIG. 8 is a circuit diagram of an embodiment of an analog computer or multiplier utilizing the galvanomagnetic resistance device.
FIG. 9 is a graphical presentation of error curves of the circuit of FIG. 8 utilizing a prior art device and utilizing a galvanomagnetic resistance device of the present invention.

FIG. 8 is an embodiment of the multiplier of FIG. 7 with the added illustration of the first and second electromagnets in schematic form. The first electromagnet 35 has two opposing pole shoes which are spaced from each other to form an air gap in which the first, third and fifth field plates 10, 19 and 23 are positioned. The second electromagnet 36 has two opposing pole shoes which are spaced from each other to form an air gap in which the second, fourth and sixth field plates 11, 20 and 24 are positioned. Furthermore, variable inductances 27, 28, 29 and 30 are connected in the circuit in the same manner as the variable inductance 6 is connected in FIGS. 3 and 4. The variable inductances 27 to 30 function to compensate for the time constants of the premagnetization windings 15 and 16 and the excitation windings 17 and 18. The multiplier circuit of FIG. 8 also includes thermistors 31, 32, 33 and 34, each of which is further indicated by a T. The thermistors 31 to 34 function to compensate for the effect of temperature variations on the circuit.

In an operable embodiment of FIG. 8, each of the first and second electromagnets 35 and 36, respectively, had an E1–38 core and an air gap of one mm. Each core had two windings of 1,250 turns each and an electrical resistance of approximately 100 ohms. The first, second, third and fourth field plates 10, 11, 19 and 20 were positioned on a ferrite carrier plate and each of said field plates had a basic resistance $R_0$ of 80 ohms. The bridge resistors 12 and 13 each had an electrical resistance of approximately 6 kilohms. The input resistance of the meter 14 of the bridge was about 50 kilohms. The first and second resistors 21 and 22 connected in series with the third and fourth field plates 19 and 20, respectively, had electrical resistances of approximately 50 ohms and 130 ohms, respectively.

Figure 10:
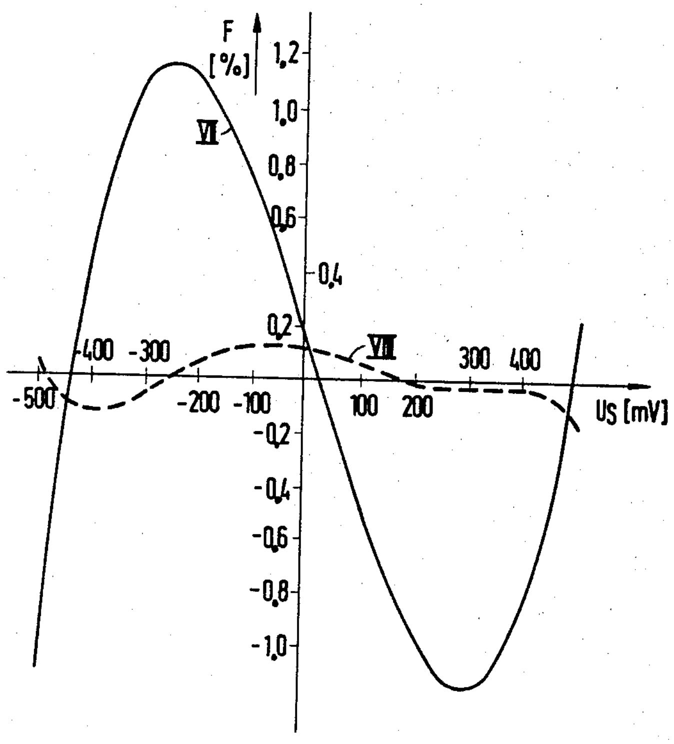
FIG. 10 is also a graphical presentation of error curves of the circuit of FIG. 8 utilizing a prior art device and utilizing a galvanomagnetic resistance device of the present invention.

FIGS. 9 and 10 are graphical presentations of the measured results of operation of the circuit of FIG. 8. In FIG. 9, curve V illustrates the error curve of the bridge signal voltage $U_S$ indicated by the meter 14, without utilizing the circuit of the excitation windings of the present invention, and curve VI illustrates the error curve of said bridge signal voltage when the galvanomagnetic resistance device circuit of the present invention is utilized. In FIG. 9, the abscissa indicates the bridge signal voltage $U_S$ in millivolts and the ordinate indicates the error F in percent.

In obtaining the curves V and VI of FIG. 9, the bridge current $I_B$ was set at 20 milliamperes and the premagnetizing current $I_V$ was set at 15 milliamperes. The current $I_0$ was varied from zero to 19 milliamperes. As shown in the curve V of FIG. 9, the maximum error F occurring when a prior art galvanomagnetic resistance device is utilized is 0.6%. As shown in the curve VI of FIG. 9, the maximum error F occurring when the galvanomagnetic resistance device of the present invention is utilized is ±0.017%. In deriving the curves V and VI of FIG. 9, the magnetic fields of the first and second electromagnets were controlled only in a positive sense. The curves of FIG. 10 were obtained by controlling the magnetic fields of the electromagnets in a negative sense.

In FIG. 10, curve VII illustrates the error curve of the bridge signal voltage $U_S$ indicated by the meter 14, without utilizing the shunt circuit of the excitation windings of the present invention, and curve VIII illustrates the error curve of said bridge signal voltage when the galvanomagnetic resistance device circuit of the present invention is utilized. In FIG. 10, as in FIG. 9, the abscissa indicates the bridge signal voltage $U_S$ in millivolts and the ordinate indicates the error F in percent. In obtaining the curves VII and VIII of FIG. 10, the current $I_0$ was varied from −18 to +18 milliamperes. As shown in the curve VII of FIG. 10, the maximum error F occurring when a prior art galvanomagnetic resistance device is utilized is ±1.15%, and as shown in the curve VIII of FIG. 9, the maximum error F occurring when the galvanomagnetic resistance device of the present invention is utilized is ±0.13%.

When the fifth and sixth field plates 23 and 24 and their series connected resistors 25 and 26, respectively, are connected in shunt with the first and second premagnetization windings 15 and 16, respectively, as in FIGS. 7 and 8, the circuit functions as a multiplier and produces a bridge signal voltage $U_S$ which is closer than 0.1% to being exactly proportional to the product of the currents $I_0$, $I_B$ and $I_1$.

While the invention has been described by means of specific examples and in specific embodiments, I do not wish to be limited thereto, for obvious modifications will occur to those skilled in the art without departing from the spirit and scope of the invention.

I claim:

1. A galvanomagnetic resistance device, comprising
- an electromagnet having an excitation winding and an air gap;
- a first field plate positioned in the air gap of said electromagnet and having an electrical resistance and a current flow therethrough;

- a second field plate positioned in the air gap of said electromagnet;
- connecting means connecting said second field plate in parallel with the excitation winding of said electromagnet whereby the resistance of said first field plate varies in proportion with the square of a current supplied jointly to said excitation winding and said second field plate; and
- supply means for supplying a current jointly to said excitation winding and said second field plate connected in parallel therewith.

2. A galvanomagnetic resistance device as claimed in claim 1, further comprising a resistor connected in series with said second field plate to provide a series connection, said connecting means connecting said series connection of said second field plate and said resistor in parallel with the excitation winding of said electromagnet.

3. A galvanomagnetic resistance device as claimed in claim 2, wherein said resistor is a variable resistor.

4. A galvanomagnetic resistance device as claimed in claim 3, further comprising a variable inductance connected in series with said second field plate and said variable resistor, said connecting means connecting said series connection of said second field plate and said variable resistor and said variable inductance in parallel with the excitation winding of said electromagnet, said variable inductance compensating for the time constant of said excitation winding.

5. A galvanomagnetic resistance device as claimed in claim 3, further comprising a thermistor connected in series with said excitation winding, said connecting means connecting said series connection of said second field plate and said variable resistor in parallel with the series connection of the excitation winding of said electromagnet and said thermistor, said thermistor compensating for the effect of temperature variations on said first field plate.

6. A galvanomagnetic resistance device as claimed in claim 5, wherein said thermistor is a variable thermistor.

7. A galvanomagnetic resistance device as claimed in claim 4, further comprising a thermistor connected in series with said excitation winding, said connecting means connecting said parallel connection of said second field plate and said variable resistor and said variable inductance in parallel with the series connection of the excitation winding of said electromagnet and said thermistor, said thermistor compensating for the effect of temperature variations on said first field plate.

8. A multiplier circuit comprising a pair of galvanomagnetic resistance devices connected in series with each other, each of said galvanomagnetic resistance devices, comprising
- an electromagnet having an excitation winding and an air gap;
- a first field plate positioned in the air gap of said electromagnet and having an electrical resistance and a current flow therethrough;
- a second field plate positioned in the air gap of said electromagnet;
- a resistor connected in series with said second field plate to provide a series connection;
- connecting means connecting said series connection of second field plate and said resistor in parallel with the excitation winding of said electromagnet whereby the resistance of said first field plate varies in proportion with the square of a total current supplied to said excitation winding and said series connection; and
- supply means for supplying a total current to said excitation winding and said series connection connected in parallel therewith.

9. A multiplier circuit as claimed in claim 8, wherein each of said galvanomagnetic resistance devices further comprises a premagnetization winding, the premagnetization windings of said galvanomagnetic resistance devices being connected in series with each other.

10. A multiplier circuit as claimed in claim 9, wherein the excitation windings of said galvanomagnetic resistance devices are connected in opposition to each other.

11. A multiplier circuit as claimed in claim 9, further comprising a bridge circuit having a plurality of branches, one of said branches comprising the first field plate of one of said galvanomagnetic resistance devices and the other of said branches comprising the first field plate of the other said galvanomagnetic resistance devices.

12. A multiplier circuit as claimed in claim 9, wherein each of said galvanomagnetic resistance devices further comprises a third field plate connected in parallel with the premagnetization winding of the corresponding galvanomagnetic resistance device.

13. A multiplier circuit as claimed in claim 12, wherein each of said galvanomagnetic resistance devices further comprises a variable resistor connected in series with the third field plate of the corresponding galvanomagnetic resistance device to provide a series connection and said series connection is connected in parallel with the premagnetization winding of the said corresponding galvanomagnetic resistance device.

References Cited

UNITED STATES PATENTS

| | | | |
|---|---|---|---|
| 3,024,997 | 3/1962 | Sun | 235—194 |
| 3,353,010 | 11/1967 | Kataoka et al. | 235—179 |
| 3,359,522 | 12/1967 | Albrecht et al. | 323—94 X |

OTHER REFERENCES

Solid State Electronics, 1964, vol. 7, Author: Sua For Sun, pages 363–371.

LEE T. HIX, *Primary Examiner.*

G. GOLDBERG, *Assistant Examiner.*